(12) United States Patent
Distelzweig et al.

(10) Patent No.: US 10,027,173 B2
(45) Date of Patent: Jul. 17, 2018

(54) POWERED SECURITY CAMERA TOOL-FREE INSTALLATION

(71) Applicant: FLIR Systems, Inc., Wilsonville, OR (US)

(72) Inventors: John Distelzweig, Santa Barbara, CA (US); Dwight Dumpert, Goleta, CA (US); Daniel Huthsing, Goleta, CA (US); Vlad Kardashov, Ontario (CA)

(73) Assignee: FLIR Systems, Inc., Wilsonville, OR (US)

( * ) Notice: Subject to any disclaimer, the term of this patent is extended or adjusted under 35 U.S.C. 154(b) by 378 days.

(21) Appl. No.: 14/588,199

(22) Filed: Dec. 31, 2014

(65) Prior Publication Data

US 2016/0020650 A1     Jan. 21, 2016

Related U.S. Application Data

(60) Provisional application No. 62/025,973, filed on Jul. 17, 2014.

(51) Int. Cl.
*H02J 5/00* (2016.01)
*H04N 5/225* (2006.01)
(Continued)

(52) U.S. Cl.
CPC ............ *H02J 50/12* (2016.02); *H04N 5/2251* (2013.01); *H04N 5/2253* (2013.01);
(Continued)

(58) Field of Classification Search
None
See application file for complete search history.

(56) References Cited

U.S. PATENT DOCUMENTS 6,430,064 B1 *  8/2002  Tsuchimoto ............ H02J 5/005
                                                          363/22
8,594,572 B1   11/2013  Ortiz et al.
(Continued)

FOREIGN PATENT DOCUMENTS

DE   10 2011 118564   5/2013
EP        2 161 808   3/2010
KR     2014 0004455   1/2014

*Primary Examiner* — Jared Fureman
*Assistant Examiner* — Joel Barnett
(74) *Attorney, Agent, or Firm* — Haynes and Boone, LLP (57) ABSTRACT

Various techniques are disclosed for providing electrical power and/or data from the interior of a building structure to a device at the exterior of the structure without piercing (e.g., making a hole through a wall or window frame) the structure. A camera surveillance system for an embodiment includes self-adhesive energy transfer units that can be placed on either side of a window so that electrical power is passed via the energy transfer units from inside a building to the outside without the need for making a hole in the window or building through which to pass electrical wire to feed power and/or data to/from the camera surveillance system. One of the energy transfer units may be integral with the camera surveillance system and the adhesive may be strong enough to support the weight of the camera surveillance system on the window. The camera surveillance system may be installed without the need for tools.

20 Claims, 7 Drawing Sheets

(51) Int. Cl.
*H02J 50/12* (2016.01)
*H04N 5/33* (2006.01)
*H04N 7/18* (2006.01)
*H04N 5/232* (2006.01)

(52) U.S. Cl.
CPC ..... *H04N 5/23203* (2013.01); *H04N 5/23241* (2013.01); *H04N 5/33* (2013.01); *H04N 7/183* (2013.01)

(56) References Cited

U.S. PATENT DOCUMENTS

| | | | |
|---|---|---|---|
| 2005/0018766 A1* | 1/2005 | Iwamura | G08B 13/19656 375/240.01 |
| 2006/0022816 A1* | 2/2006 | Yukawa | G08B 25/006 340/521 |
| 2007/0152819 A1* | 7/2007 | Marszalek | G08B 13/1409 340/568.4 |
| 2009/0127937 A1* | 5/2009 | Widmer | H02J 5/005 307/149 |
| 2011/0309791 A1 | 12/2011 | Mitake et al. | |
| 2012/0086281 A1* | 4/2012 | Kanno | H02J 5/005 307/82 |
| 2012/0299557 A1* | 11/2012 | Kwon | H02J 5/005 320/166 |

* cited by examiner

POWERED SECURITY CAMERA TOOL-FREE INSTALLATION

CROSS REFERENCE TO RELATED APPLICATIONS

This application claims the benefit of priority from U.S. Provisional Application No. 62/025,973, filed Jul. 17, 2014, which is incorporated herein by reference in its entirety.

BACKGROUND

Technical Field

The present disclosure relates generally to placement and mounting of security cameras—which may include thermal imaging devices—and, more particularly, to installation of consumer surveillance camera systems without making holes to pass wiring—such as for either or both of power supply and data communication—from the exterior to the interior of a structure and generally without the need for any tools.

Related Art

There is often a need or desire to place various electrical devices, such as surveillance cameras, requiring a reliable supply of electrical power, such as line power, at exterior locations around a premises, including buildings and grounds. In general, for owners of a property, electrical outlets may be provided, for example, by installing outdoor power outlets on the exterior of structures or running exterior grade conduit and wiring to be integrated with various landscaping features on the premises. Such solutions may be expensive, however, and a simpler solution may be sought by running wiring through a hole in the structure, or making provisions for passing wiring through a pre-existing opening, such as a door or window. Such simple solutions may not always be able to be satisfactorily implemented (e.g., causing water or moisture entry problems or allowing heating or cooling loss) or may not be aesthetically pleasing, however, and for renters, most likely may be forbidden due to the modifications made to the structure. Also, for many consumers, making such modifications may require the use of tools and knowledge of building construction and construction techniques with which they are not familiar and would rather not deal with.

Thus appears a need for a way to provide a reliable supply of electrical power from the interior of a building to its exterior without piercing the structure.

SUMMARY

Various techniques are disclosed for providing electrical power and data communication from the interior of a building structure to a device at the exterior of the structure without piercing the structure (e.g., making a hole through a wall).

In one embodiment, a system includes a first energy transfer unit disposed within a building structure and configured to receive a supply of electrical power and transmit the supply of electrical power via electromagnetic near-field energy transfer; and a second energy transfer unit disposed external to the building structure and within the near field of the first energy transfer unit and configured to receive the supply of electrical power via electromagnetic near-field energy transfer and conduct the supply of electrical power to an electrical device comprising a camera disposed external to the building structure.

In another embodiment, a method includes: placing a first energy transfer unit within a building structure to receive a supply of electrical power and generate an electromagnetic energy field; placing a second energy transfer unit external to the building structure to be within the electromagnetic energy field of the first energy transfer unit; transmitting the supply of electrical power via the electromagnetic energy field from the first energy transfer unit to the second energy transfer unit; and conducting the supply of electrical power from the second energy transfer unit to an electrical device comprising a camera.

In still another embodiment, a camera system includes an electrical device comprising a camera; a first energy transfer unit affixed to a first surface of a window, the first surface being interior to a building structure, the first energy transfer unit configured to receive a supply of electrical power from a power supply interior to the building and to transmit the supply of electrical power via electromagnetic near-field energy transfer, and a second energy transfer unit affixed to a second window surface of the window, the second window surface being exterior to the building structure, and the second energy transfer unit being disposed in the near field of the first energy transfer unit and configured to receive the supply of electrical power via the electromagnetic near-field energy transfer and conduct the supply of electrical power to the electrical device.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In one or more embodiments, electrical power is provided from the interior of a building structure to a device at the exterior of the structure without piercing—e.g., making a hole through a wall, window, window frame, or door frame of—the structure. In one embodiment, a camera surveillance system may be conveniently and easily installed without the use of tools (e.g., such common tools as a hammer, screw driver, drill, or saw) requiring, for example, no more than peeling a protective backing from a pressure-sensitive self-adhesive attached to each of a pair of energy transfer units and placing the energy transfer units opposite each other on either side of a window. Electrical power may then be passed using electromagnetic near-field energy transfer through the window between the two energy transfer units.

The near-field energy transfer may comprise, for example, either induction using magnetic fields or resonant transfer using oscillating electromagnetic fields. In one example, the inside energy transfer unit may transmit power and the outside energy transfer unit may receive power transmitted from the inside unit. The outside energy transfer unit may be integral with a compact camera surveillance system and a power cord attached to the inside energy transfer unit can then be plugged into a wall outlet to make the system operational. A few of the number of alternative configurations are described in the examples given below of various embodiments.

In one embodiment, for example, a camera surveillance system 100 includes self-adhesive energy transfer units (e.g., Powermat® products provided by Powermat Technologies Ltd. of Neve Ilan, Israel or resonant energy transfer units provided by WiTricity Corporation of Watertown, Mass., USA) that can be placed on either side of a window of a building so that electrical power is passed via the energy transfer units from the inside to the outside through the window without the need for making a hole in the window or building (e.g., the window frame) through which to pass the electrical wire that feeds power to the camera surveillance system. The outside energy transfer unit may be integral with the camera surveillance system and the adhesive may be strong enough to support the weight of the camera surveillance system on the window. In another embodiment, the outside energy transfer unit may have a power cord that connects it to the camera surveillance system so that only the outside energy transfer units needs to be affixed to the window while the camera surveillance system can be mounted at another location, such as on a wall or under an eve.

Various aspects of an energy transfer unit (e.g., a power mat) may be taught by United States Patent Publication No. 2013/0043833, published Feb. 21, 2013, and by United States Patent Publication No. 2012/0193993, both of which are incorporated by reference. Various aspects of an energy transfer unit (e.g., a resonator) using resonant energy may be taught by U.S. Pat. No. 8,772,971, issued Jul. 8, 2014, which is incorporated by reference.

Figure 1A:
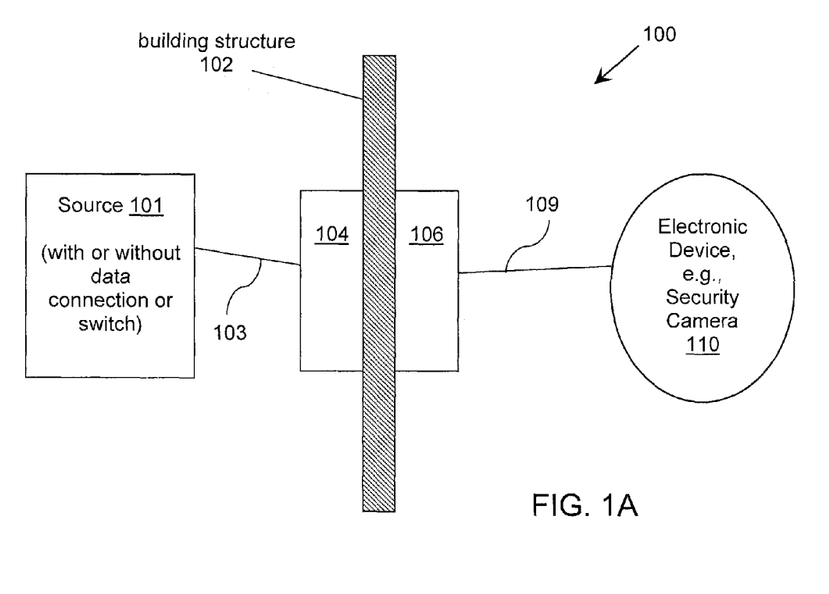
FIG. 1A is a general system block diagram illustrating a surveillance system 100, in accordance with one or more embodiments of the disclosure.

FIG. 1A is a general system block diagram illustrating a surveillance system 100, in accordance with one or more embodiments. As seen in FIG. 1A, system 100 may include energy transfer units 104 and 106, an electrical conductor 103 for connecting energy transfer unit 104 to a source 101, an electronic device 110, and an electrical conductor 109 for connecting energy transfer unit 106 to electronic device 110. Energy transfer units 104 and 106 may provide transmission of electrical energy, whether for communication signals or power transmission, through a portion of a building structure 102 (e.g., glass of a window) without piercing the building structure 102 (e.g., without making a hole in the window or window frame). In one or more embodiments, transmission of electrical energy between energy transfer units 104 and 106 may be effected by electromagnetic near-field coupling using either magnetic induction or resonant energy transfer. In one embodiment, electrical energy may be transferred from energy transfer unit 104 to energy transfer unit 106, or between the units, using magnetic induction, such as practiced using an electrical transformer, for example. In another embodiment, electrical energy may be transferred from energy transfer unit 104 to energy transfer unit 106, or between the units, using electromagnetic near-field resonant energy transfer in which a source resonator (e.g., energy transfer unit 104) provides an oscillating near field region within which a receiving resonator (e.g., energy transfer unit 106) is located and resonates at or near the oscillating frequency of the near field region.

Figure 1B:
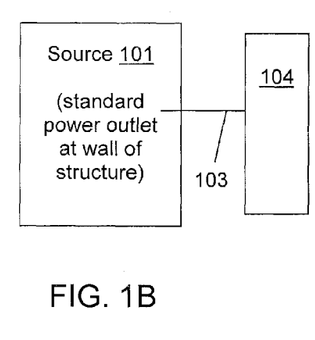
FIGS. 1B, 1C, and 1D are system block diagrams illustrating a portion of surveillance system 100 seen in FIG. 1A, in accordance with various alternative embodiments.

Source 101 may be, for example, a typical wall outlet of a residential structure, supplying 120 VAC (volts, alternating current) via electrical conductor 103, which may be a typical 2 or 3-conductor power cord, to energy transfer unit 104, as illustrated by FIG. 1B. In one embodiment, energy transfer unit 104 may receive a supply of electric power from the wall outlet via a small, plug-in power supply, commonly referred to as a "wall wart", in which case conductor 103 may be a small insulated wire pair (much smaller than the typical 2 or 3-conductor power cord) conducting, typically, 12-15 VDC (volts, direct current). Energy transfer unit 106 may provide a supply of electric power via a conductor 109 (e.g., a second power cord, printed circuit board conductors, or conductive mounting chassis) to electronic device 110.

Figure 1C:
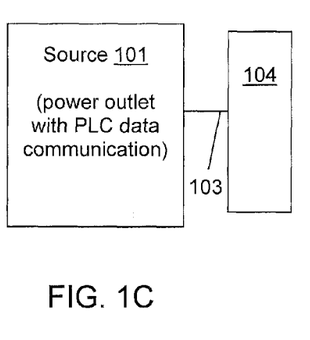

Source 101 may be, for example, a power outlet with a power line carrier (PLC) data capability, as illustrated by FIG. 1C. In that case, electrical conductor 103 may be configured to carry both power and communication signals (e.g., data signals) between source 101 and electronic device 110 via energy transfer units 104, 106. With a PLC embodiment, Conductor 103 may be configured to carry both power and communication signals (e.g., data signals) between source 101 and energy transfer unit 104; and energy transfer units 104 and 106 may be configured to pass electrical energy both for power transmission and for data signal transmission to electronic device 110. With a PLC embodiment, energy transfer unit 106 may provide data signal communication and a supply of electric power via a conductor 109 (e.g., a second power cord, printed circuit board conductors, or conductive mounting chassis) to electronic device 110.

Figure 1D:
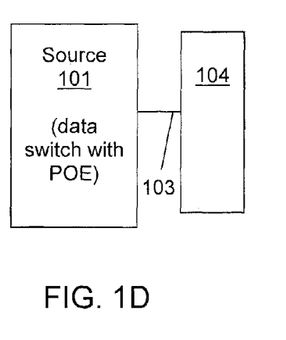

Source 101, in another example, may be a power source equipment (PSE), typically a data switch with power over Ethernet (POE) capability, as illustrated by FIG. 1D. In that case also, electrical conductor 103 may be configured to carry both power and communication signals (e.g., data signals) between source 101 and electronic device 110 via energy transfer units 104, 106. For a POE capable embodiment of system 100, conductor 103 may be typical Ethernet cable such as twisted pair CAT5, CAT5e, or CAT6 cable. In various embodiments, power supply and data signal may be carried on conductor 103 by the same pair of wires or may be carried by separate, distinct pairs of wires.

With a POE embodiment, energy transfer units 104 and 106 may be configured to pass electrical energy both for power transmission and for data signal transmission to electronic device 110. In one embodiment, a POE splitter may be interposed between conductor 109 and electronic device 110. In one embodiment, instead of PSE with POE capability, a data switch may be provided for connecting an Ethernet signal to conductor 103 and conductor 103 may also be connected to a POE injector for providing both signal and power over conductor 103 to energy transfer unit 104. With a POE embodiment, energy transfer unit 106 may provide data signal communication and a supply of electric power via a conductor 109 (e.g., a second Ethernet cable (e.g., CAT5, CAT5e, or CAT6 cable), printed circuit board conductors, or conductive portions of a mounting chassis or hardware) to electronic device 110.

Figure 1E:
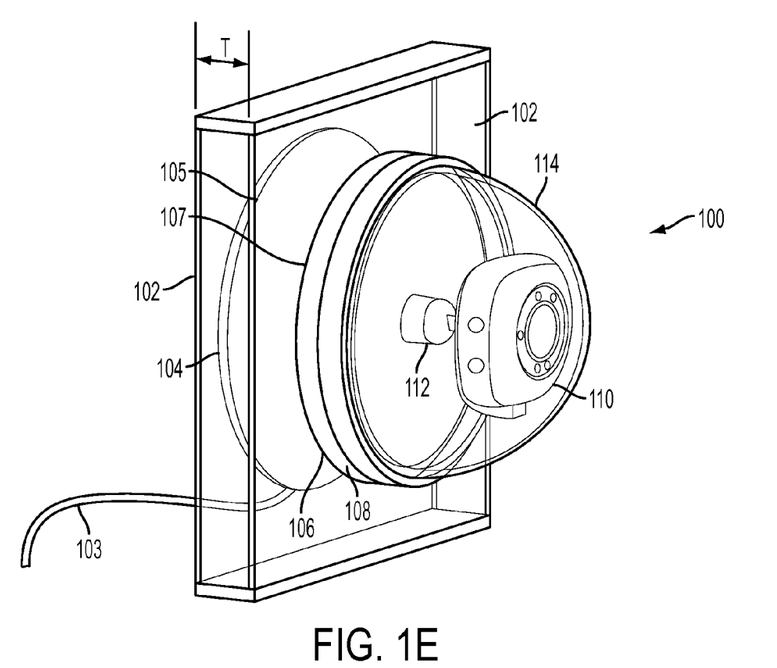
FIG. 1E is a perspective cut-away view of a surveillance system, in accordance with an embodiment, mounted to glass, such as a window of a residential structure.

FIG. 1E illustrates a surveillance system 100, in accordance with one embodiment. As seen in FIG. 1E, system 100 may be mounted to glass 102, such as a window of a residential building structure and may include energy transfer units 104 and 106. As shown, first energy transfer unit 104 may be located inside the structure or building and second energy transfer unit 106 may be embedded in a base piece 108 of surveillance system 100 which is disposed outside the structure. Each of energy transfer units 104 and 106 may be affixed to a respective interior or exterior (relative, e.g., to the building structure of which glass 102 may provide a window, door, or other building surface) surface of glass 102 with, for example, a self-adhering, pressure-sensitive adhesive 105, 107 (respectively for each of energy transfer units 104, 106), which may be supplied with a protective backing that is easily removable by hand for tool-free installation of surveillance system 100, including energy transfer units 104 and 106.

Energy transfer units 104, 106 may include power mat type products provided by Powermat Technologies Ltd. of Neve Ilan, Israel. Energy transfer units 104, 106 alternatively may include resonant energy transfer products provided by WiTricity Corporation of Watertown, Mass., USA. Energy transfer unit 104 may receive a supply of electric power via an electrical conductor 103 connected to a power supply (not shown) such as a "wall wart" connected to a standard electrical outlet inside the building structure. Energy transfer unit 106 may provide a supply of electric power via a conductor 109 (e.g., a second power cord, printed circuit board conductors, or conductive mounting chassis) to electronic device 110.

Figure 6A:
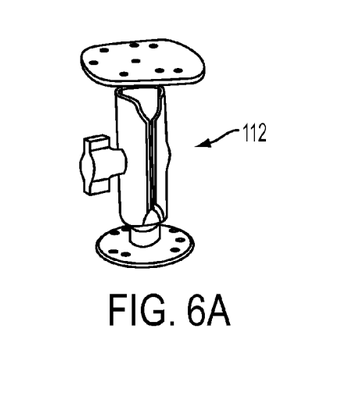
FIGS. 6A and 6B are perspective views of camera mounting fixtures for a surveillance system, according to alternative embodiments.
Figure 6B:
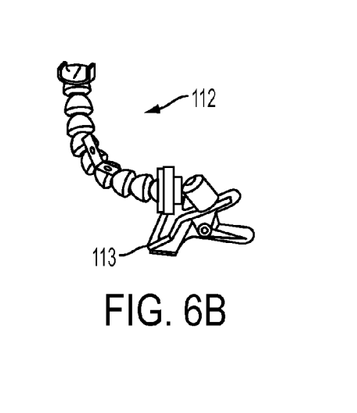

Surveillance system 100 may include an electrically powered electronic device 110 (more briefly electrical device) such as an optical and/or thermal imaging video surveillance camera system as shown in FIG. 1E. For example, in various embodiments, electrical device 110 may include a non-thermal imaging module (e.g., a charge-coupled device (CCD) imager or other visible and/or near infrared light imaging device) and/or a thermal imaging module (e.g., a focal plane array having an array of microbolometers or other thermal imaging device) and may include other imaging components such as lenses and image processing circuitry suitable for processing and/or combining non-thermal and/or thermal imaging data. Electrical device 110 may be supported relative to base piece 108 by a mounting bracket 112. Mounting bracket 112 may include a friction-stabilized pivot for easily adjusting the position of video surveillance camera system, electrical device 110, by hand and without the need for tools. Additional examples of mounting brackets 112 are shown in FIGS. 6A and 6B.

Surveillance system 100 may include a removable protective dome 114 for covering and protecting electrical device 110. Protective dome 114 may be unlocked and removed for example by a simple twisting motion that can be accomplished by hand without the use of tools. Protective dome 114 may be easily replaced by a similar hand twisting motion in the other direction from that used to remove protective dome 114 and which may lock the dome in place, again without the use of tools (for example). When twisted back to the locked position, protective dome 114 may provide a weather-proof seal for protection of electrical device 110, mounting bracket 112, and interior of base piece 108 from the environment. Protective dome 114 may be made from polyethylene, for example, for efficient use with a thermal imaging camera; and from polycarbonate, for example, for efficient use with an optical imaging camera. In another embodiment, electrical device 110 may be provided with neither a base piece 108 nor a protective dome 114 (e.g., a self-contained outdoor surveillance camera or other electronic device) and may be connected by a power cable 120 (see FIG. 3) to energy transfer unit 106.

Glass 102 may have an effective thickness T as indicated in FIG. 1E so that first energy transfer unit 104 is separated from second energy transfer unit 106 by the distance T. For a glass 102 with thickness T of up to 25 millimeters (mm), for example, and using energy transfer units 104, 106 approximately 3 inches square (e.g., covering an area of window glass of 9 square inches) approximately 5.0 Watts (W) of electrical power can be passed inductively between the first and second energy transfer units 104, 106 (e.g., power mats) from the interior of the structure to the exterior through a portion of the structure, such as a glass window, without modification to the building structure. Similarly, resonant near-field energy may be used to pass electrical power from the interior of the structure to the exterior through a portion of the structure, such as a glass window, without modification to the building structure.

Figure 2:
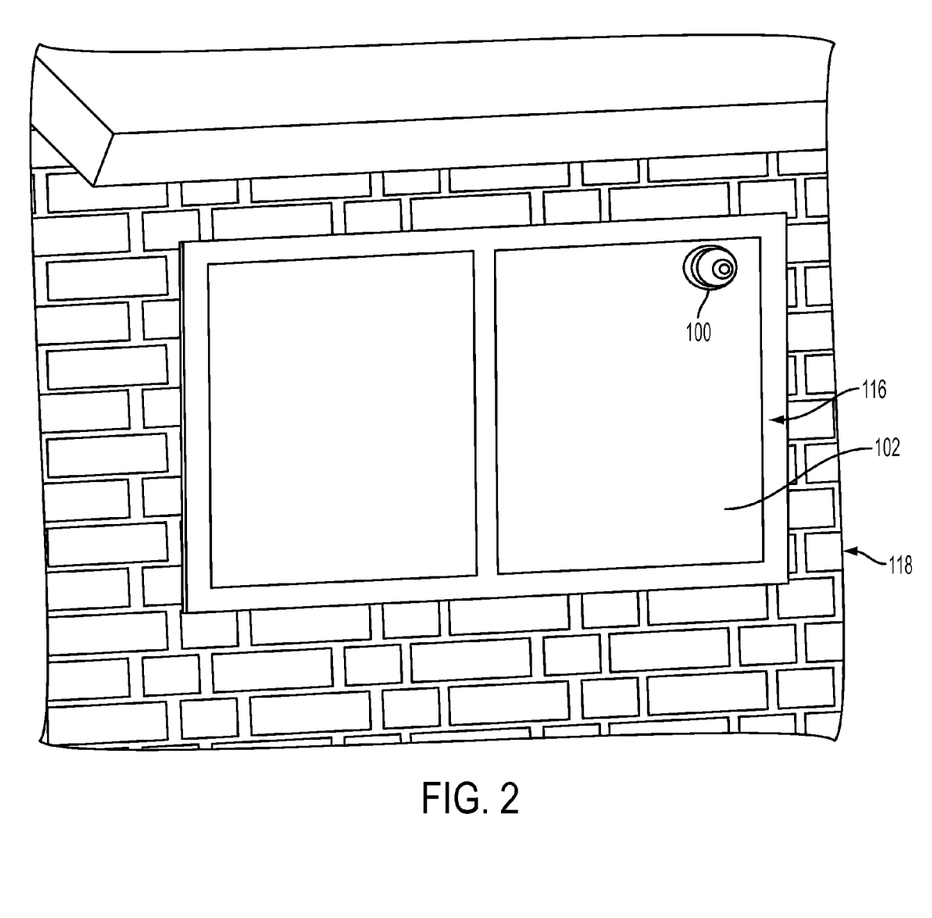
FIG. 2 is a perspective overall view of a surveillance system, in accordance with an embodiment, mounted to glass, such as a window of a residential structure.

FIG. 2 illustrates an example of mounting a surveillance system 100, in the configuration shown in FIG. 1E, in accordance with an embodiment, to glass 102 of a window 116 of a building 118.

Figure 3:
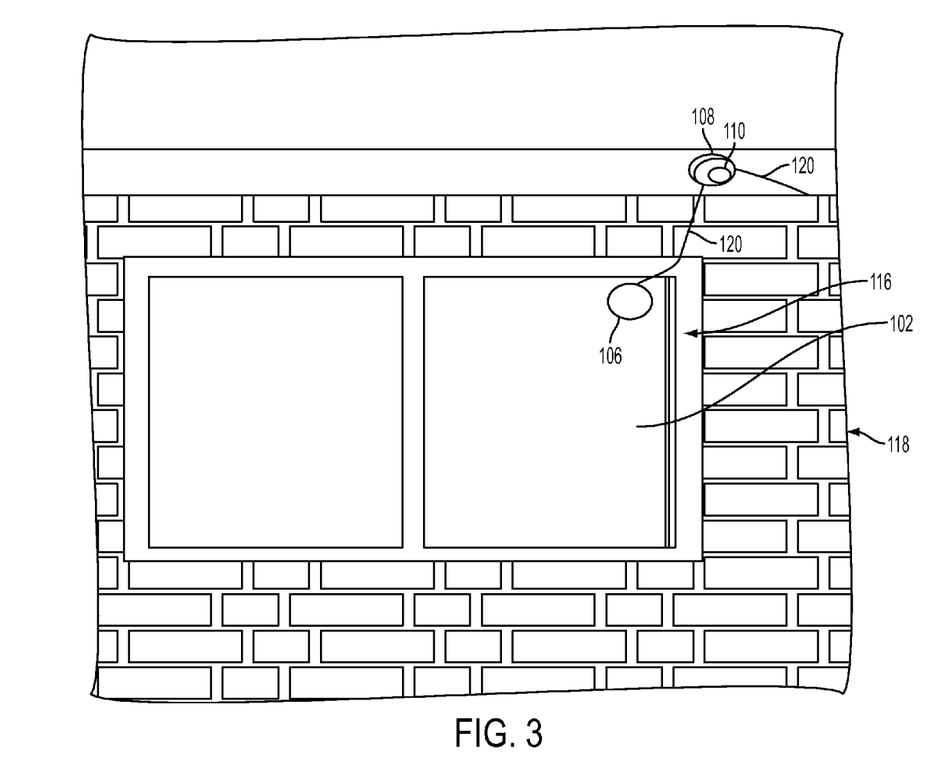
FIG. 3 is a perspective overall view of a surveillance system, mounted to the exterior of a building structure and having electrical power supplied from the interior of the structure to the exterior through a portion of the structure, such as a glass window, in accordance with an alternative embodiment.

FIG. 3 illustrates a surveillance system 100, mounted to the exterior of a building structure, in accordance with an alternative embodiment. As shown in FIG. 3, electrical device 110 supported by base piece 108 may be attached at any suitable location to the exterior of building 118. For example, base piece 108 may be provided with its own double sided adhesive foam backing with removable protective (peel-off) covering so that it can be easily mounted without tools at location (e.g., under the eves) such as that shown in FIG. 3. The adhesive used for mounting base piece 108 and energy transfer unit 106 may have sufficient strength for fixing the electrical device to a surface and supporting the weight of the electrical device. Electrical device 110 may be connected by a wire (cable or cord) 120 to energy transfer unit 106 mounted on glass 102 of window 116 of building 118 so that wire 120 conducts the supply of electrical power from the energy transfer unit 106 to electrical device 110.

As shown in FIGS. 1E, 2, and 3, the adhesive used for energy transfer unit 104 may have sufficient strength to support the weight of energy transfer unit 104 and a sufficient length of associated electrical conductor 103 used to reach a power supply. (Such sufficient length may be only a small unsupported length of cord, for example.) Similarly, the adhesive used for energy transfer unit 106 may have sufficient strength to support the weight of energy transfer unit 106 and remainder of the camera surveillance system 100 (e.g., base piece 108, electrical device 110, mounting bracket 112, protective dome 114) in one embodiment or, in an alternative embodiment, the weight of energy transfer unit 106 and a sufficient length of associated power cord 120 used to reach the remainder of the camera surveillance system 100.

Figure 4:
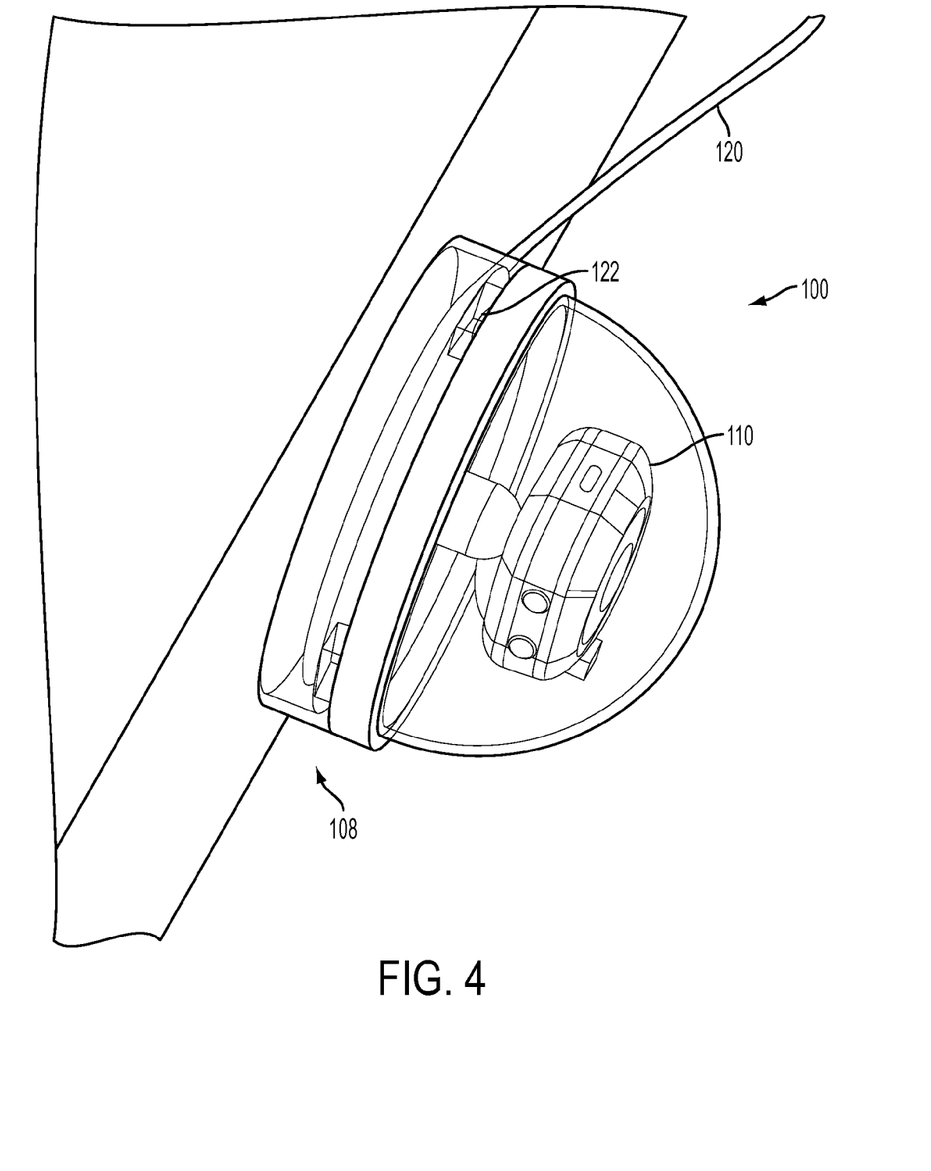
FIG. 4 is a perspective view of a surveillance system mounted to a building structure and having a retractable power supply cord, in accordance with an embodiment.

FIG. 4 illustrates a surveillance system 100 mounted to a building structure and having a retractable or otherwise storable power supply cable 120, in accordance with an embodiment. As shown in FIG. 4, base piece 108 may include an apparatus 122 for storing a portion of the cable 120. The cable storing apparatus 122 may store a variable length of cable in base piece 108 so that extra length of cable 120 not needed to reach from energy transfer unit 106 to electrical device 110 may be stored using cable storing apparatus 122. In one embodiment, cable storing apparatus 122 may remain in proximity to passing unit 106 (e.g., at the window), while in an alternative embodiment cable storing apparatus 122 may remain in proximity to electrical device 110 (e.g., at a position remote from the window such as under the eves). Base piece 108 may be used to house cable storing apparatus 122 in either, both, or neither embodiment. In one embodiment, cable storing apparatus 122 may include features for automatically retracting cable into cable storing apparatus 122 (e.g., into base piece 108).

Figure 5A:
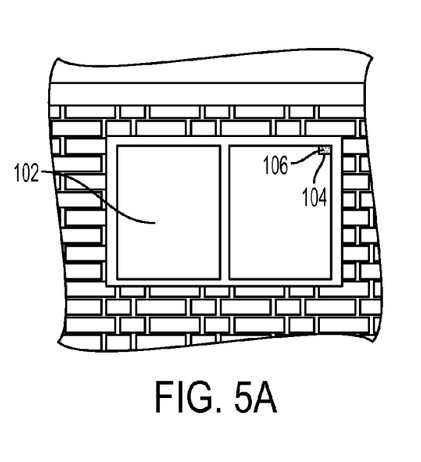
FIGS. 5A and 5B are perspective views of a power supply transmission portion of a surveillance system, according to alternative embodiments.
Figure 5B:
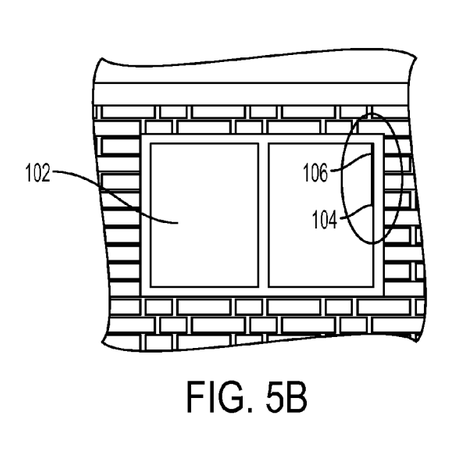

FIGS. 5A and 5B illustrate alternative embodiments for energy transfer units 104, 106 of system 100. As seen in FIGS. 1E, 2, and 3, energy transfer units 104, 106 (e.g., power mats or resonant energy transfer units) may be provided with a round shape. The round shape may be easily aligned when being installed (e.g., affixed on either side of a window using a self-adhesive backing) and may be efficient for producing a near-field magnetic flux that inductively couples the two energy transfer units 104, 106 (alternatively, an oscillating electromagnetic near-field that resonantly couples energy transfer units 104, 106) for passing electrical power between them through the window glass. Other shapes may be desirable, however, for various reasons, constraints, and other considerations. For example, either of a square or rectangular shape may be considered to be less obtrusive of window viewing area or to be more easily concealed for aesthetic or security reasons.

FIG. 5A shows a square shape for energy transfer units 104, 106 that can be used for transmission of electrical power between two energy transfer units 104, 106 (e.g., square power mats) that are substantially aligned with each other; and FIG. 5B shows a rectangular shape for energy transfer units 104, 106 (e.g., rectangular or strip-like power mats) that can fit along a window edge and that can be used for transmission of electrical power between two rectangular energy transfer units 104, 106 that are substantially aligned with each other FIGS. 6A and 6B illustrate alternative embodiments for camera mounting brackets 112 for a surveillance system 100, in accordance with alternative embodiments. The example in FIG. 6A shows a mounting bracket 112 having a neck joining a pair of ball and socket joints with a thumbscrew on the neck that can easily be loosened and tightened by hand, without tools, in order to reposition the two ends of the bracket 112 relative to each other, thus allowing position adjustment of electrical device 110 relative to base piece 108. The example in FIG. 6B shows a mounting bracket 112 having a hand operated clamp 113 at one end joined by a flexible neck to the other end. The flexible neck can easily be adjusted by hand, without tools, in order to reposition the two ends of the bracket 112 relative to each other, thus allowing position adjustment of electrical device 110 relative to base piece 108. Clamp 113 can easily be affixed by hand to a variety of objects, such as window or door frames, for example. A wide variety of alternative camera mounting options for mounting bracket 112 may be implemented using, for example, ball joints, tripod mounts including clamps and gorilla pods, adhesives for single installation, and standard screw mounting techniques.

Figure 7:
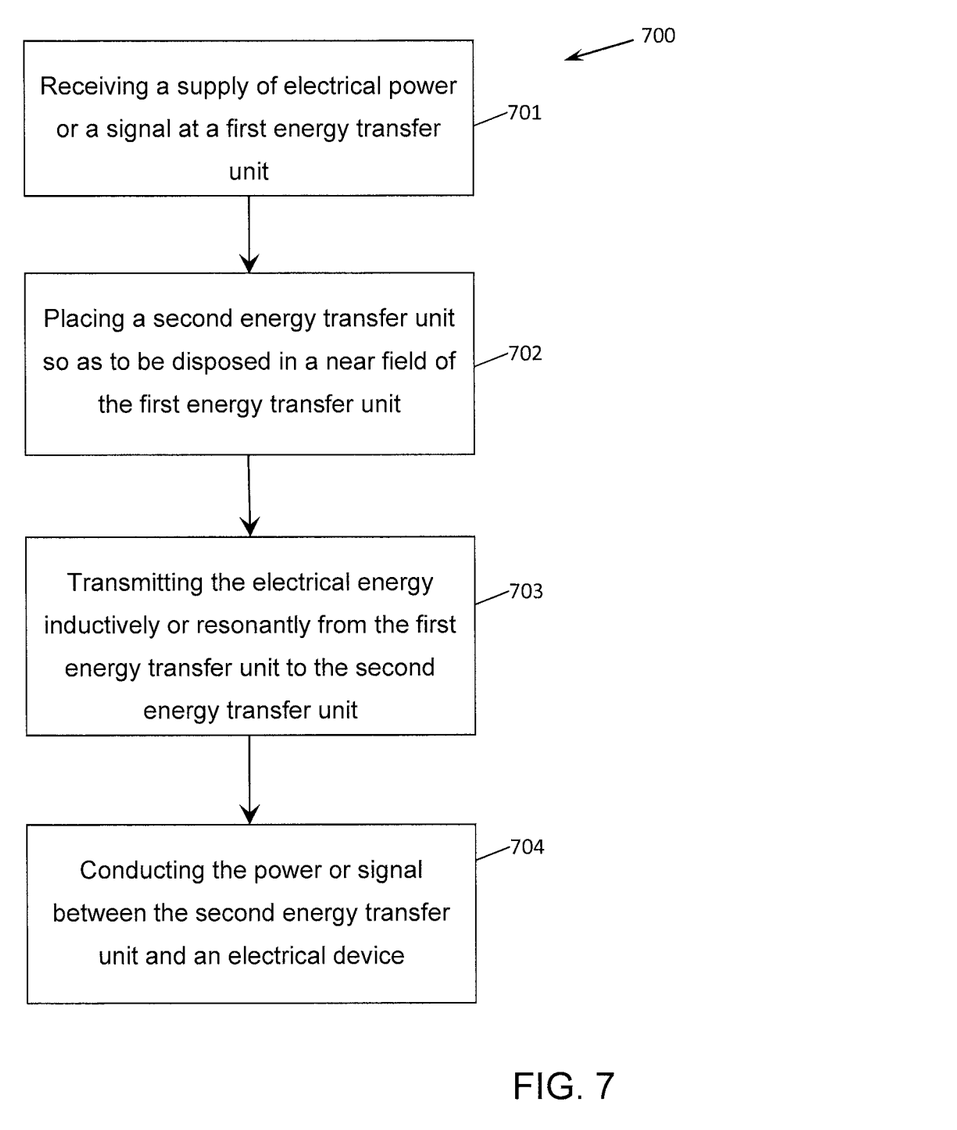
FIG. 7 is a flow diagram illustrating a method 700, in accordance with one or more embodiments, for providing electrical power from inside a building to its outside without piercing or otherwise running an electric cable through the building structure.

FIG. 7 illustrates a method 700 for providing electrical power from inside a building to its outside without piercing or otherwise passing an electric cable through the building structure. At 701, a first energy transfer unit (e.g., energy transfer unit 104 disposed on a window or other interior surface of the building structure) receives a supply of electrical power (e.g., from a wall wart plugged into a standard interior electrical outlet) via an electrical power cord (e.g., electrical conductor 103). The first energy transfer unit (e.g., energy transfer unit 104 or 106) may receive a data signal from a source 101 as described above or from electronic device 110.

At 702, method 700 continues with a second energy transfer unit (e.g., energy transfer unit 106) being disposed on an exterior surface (e.g., directly opposite so as to be overlapping the first energy transfer unit 104) in a near field of the first energy transfer unit, when the first energy transfer unit is receiving the supply of electrical power.

At 703, method 700 continues with the electrical energy (signal or power supply) being transmitted via electromagnetic near-field energy transfer from the first energy transfer unit (e.g., energy transfer unit 104 or a first power mat) to the second energy transfer unit (e.g., energy transfer unit 106 or a second power mat). In the case of a communication signal, the energy may be transmitted in either direction.

At 704, method 700 continues with conducting the electrical power or signal from the second energy transfer unit (e.g., energy transfer unit 106) to an electrical device (e.g., electrical device 110, which may be a surveillance camera as in the examples of embodiments shown in the figures). For example, a conductive connection (e.g., electrical conductor 109) such as a short length of cable or twisted pair of wires may be made from energy transfer unit 106 through base piece 108 and mounting bracket 112 to electrical device 110. In an alternative embodiment, the conductive connection may be made to include power supply cable 120.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
an electrical device comprising a camera and disposed external to a building structure;
a first energy transfer unit disposed within the building structure and configured to receive a supply of electrical power and a data signal on a first conductor configured to carry both power and communication signals and transmit the supply of electrical power and the data signal via electromagnetic near-field energy transfer; and
a second energy transfer unit disposed external to the building structure and within a near field of the first energy transfer unit and configured to receive the supply of electrical power and the data signal via electromagnetic near-field energy transfer and conduct the supply of electrical power and the data signal on a second conductor configured to carry both power and communication signals to the electrical device.

2. The system of claim 1, wherein:
each of the first and second energy transfer units includes an adhesive configured to fix each energy transfer unit to a surface of the building structure and support a weight of each energy transfer unit.

3. The system of claim 1, wherein:
the second energy transfer unit is integral with the electrical device; and
the second energy transfer unit includes an adhesive configured to fix the electrical device to a surface and support a weight of the electrical device.

4. The system of claim 1, further comprising:
a wire coupled to the second energy transfer unit and the electrical device and configured to conduct the supply of electrical power and/or data signal between the second energy transfer unit and the electrical device.

5. The system of claim 4, wherein the electrical device further comprises an apparatus configured to store an extra length portion of the wire and to automatically retract the extra length portion of the wire into a housing of the device.

6. The system of claim 1, wherein:
the first energy transfer unit is disposed on a window inside the building structure;
the second energy transfer unit is disposed on the window outside the building structure; and
the second energy transfer unit is configured to receive the supply of electrical power and data signal via electromagnetic near-field energy transfer without modification to the building structure.

7. The system of claim 1, wherein the first energy transfer unit is connected via a power cord to a power supply powered by an electrical outlet inside the building structure.

8. The system of claim 1, wherein the camera comprises an infrared sensor and/or a visible light sensor, and wherein the infrared sensor and/or visible light sensor is configured to pass a video or thermal image data signal via the first and second energy transfer units.

9. A method comprising:
placing a first energy transfer unit within a building structure to receive a supply of electrical power and a data signal on a first conductor configured to carry both power and communication signals and generate an electromagnetic energy field;
placing a second energy transfer unit external to the building structure to be within the electromagnetic energy field of the first energy transfer unit;
transmitting the supply of electrical power and the data signal via the electromagnetic energy field from the first energy transfer unit to the second energy transfer unit; and
conducting the supply of electrical power and the data signal from the second energy transfer unit on a second conductor configured to carry both power and communication signals to an electrical device comprising a camera.

10. The method of claim 9, wherein the placing the first energy transfer unit comprises affixing the first energy transfer unit to a window inside the building structure with a pressure sensitive adhesive not requiring the use of any tools for mounting the first energy transfer unit.

11. The method of claim 9, wherein the placing the second energy transfer unit comprises affixing the second energy transfer unit to a window outside the building structure with a pressure sensitive adhesive not requiring the use of any tools for mounting the second energy transfer unit.

12. The method of claim 11, wherein the second energy transfer unit is integral with the electrical device.

13. The method of claim 9, wherein the conducting further comprises conducting the supply of electrical power from the second energy transfer unit via one or more wires connected to the electrical device, and wherein the one or more wires further transfers data to and from the electrical device and the second energy transfer unit.

14. The method of claim 13, further comprising storing an extra portion of the wire within a wire storing apparatus of the electrical device.

15. The method of claim 9, further comprising receiving the supply of electrical power and data signal by the second energy transfer unit via electromagnetic near-field energy transfer without modification to the building structure.

16. The method of claim 9, further comprising conducting the supply of electrical power from a power supply powered by an electrical outlet inside the building structure via a power cord to the first energy transfer unit.

17. The method of claim 9, further comprising passing a video or thermal imaging camera surveillance data signal from the electrical device via the first and second energy transfer units.

18. A camera system comprising:
an electrical device comprising a camera;
a first energy transfer unit affixed to a first surface of a window, the first surface being interior to a building structure, the first energy transfer unit configured to receive a supply of electrical power and a data signal on a first conductor configured to carry both power and communication signals from a power supply interior to the building and to transmit the supply of electrical power and data signal via electromagnetic near-field energy transfer; and
a second energy transfer unit affixed to a second window surface of the window, the second window surface being exterior to the building structure, and the second energy transfer unit being disposed in a near field of the first energy transfer unit and configured to receive the supply of electrical power and data signal via the electromagnetic near-field energy transfer and conduct the supply of electrical power and the data signal on a second conductor configured to carry both power and communication signals to the electrical device.

19. The camera system of claim 18, further comprising:
a cable configured to conduct the supply of electrical power and/or data from the second energy transfer unit to the electrical device; and
an apparatus for storing a portion of the cable.

20. The camera system of claim 18, wherein:
the second energy transfer unit receives the supply of electrical power and data signal via electromagnetic near-field energy transfer without modification to the building structure;
the first energy transfer unit is connected via a power cord to a power supply inside the building structure; and
the camera comprises an infrared sensor and/or a visible light sensor.

* * * * *